United States Patent
Everett

(10) Patent No.: US 7,480,378 B2
(45) Date of Patent: Jan. 20, 2009

(54) METHOD AND SYSTEM FOR INCREASING SUBSCRIBER LINE INTERFACE CIRCUIT VOLTAGE DURING RINGING

(75) Inventor: Kenneth Wayne Everett, Hoschton, GA (US)

(73) Assignee: Arris International, Inc., Suwanee, GA (US)

( * ) Notice: Subject to any disclaimer, the term of this patent is extended or adjusted under 35 U.S.C. 154(b) by 1582 days.

(21) Appl. No.: 10/324,321

(22) Filed: Dec. 20, 2002

(65) Prior Publication Data

US 2003/0121052 A1 Jun. 26, 2003

Related U.S. Application Data

(60) Provisional application No. 60/342,987, filed on Dec. 22, 2001.

(51) Int. Cl.
*H04M 1/00* (2006.01)
*H04M 9/00* (2006.01)
(52) U.S. Cl. .................................. 379/413.01
(58) Field of Classification Search ............. 379/413.01
See application file for complete search history.

(56) References Cited

U.S. PATENT DOCUMENTS 5,490,054 A * 2/1996 Hanebrink, Jr. .......... 363/21.09

* cited by examiner

*Primary Examiner*—Alexander Jamal
(74) *Attorney, Agent, or Firm*—John Doughty

(57) ABSTRACT

A voltage controller increases a DC input voltage in response to a ring instruction received from a processor in a control signal. The increased voltage is converted to an AC ring signal that causes a telephone to ring. The ring signal voltage is generated at a battery high node ("$V_{BH}$") and may be routed to a SLIC before being sent to an on-hook telephone.

The voltage at $V_{BH}$ is kept low during off-hook and other periods when a ring instruction is not present. Thus, voltages internal to an indoor device that houses the controller are kept below a predetermined safe threshold, thereby allowing the periods of high voltage to be deemed as transient. Accordingly, if the device is unearthed, or not grounded to the earth, the device may nevertheless obtain listing by a certifying and testing organization without being subjected to abnormal testing and possible failure thereof.

1 Claim, 3 Drawing Sheets

METHOD AND SYSTEM FOR INCREASING SUBSCRIBER LINE INTERFACE CIRCUIT VOLTAGE DURING RINGING

CROSS REFERENCE TO RELATED APPLICATION

This application claims the benefit of priority under 35 U.S.C. 119(e) to the filing date of Everett, U.S. provisional patent application No. 60/342,987 entitled "VBH Switching During Ringing To Eliminate Double Insulation Requirements", which was filed Dec. 22, 2001, and is incorporated herein by reference.

FIELD OF THE INVENTION

This invention relates, generally, to communication networks and, more particularly, providing increased voltage at a telecommunications Subscriber Line Interface Circuit ("SLIC"), during ringing.

BACKGROUND

In a plain old telephone service ("POTS") system, a telephone is designed to receive a "ring" signal, typically an AC wave at 20 hertz (Hz) of approximately 40 V RMS, when it is supposed to ring. It will be appreciated that other ring voltages are often used that fall within a range equal to or greater than 40 V RMS. The ringing signal is/was traditionally sent along the twisted pair telephone wire that connects an individual telephone to the telephony network. A typical telephone still uses the higher ring signal voltage, even if the telephony communications are transmitted along non-traditional pathways, such as, for example, community antennae television ("CATV") coaxial cable, optical fiber cable, or any other network technology that transmits communications signals. When one of these technologies is used, a telephone is typically connected to a line card that provides an interface between the telephone and the communications network. Such a line card typically contains subscriber line interface circuitry ("SLIC") that is designed to translate a signal from the network protocol to the traditional telephony protocol. A node within the line card circuitry may be maintained at a constant 90-95 V level, and when an instruction to ring is received, the 90-95 V source is directed to the telephone in accordance with a predetermined waveform shape. Thus, when a line card receives a signal that instructs it to cause a telephone connected thereto to ring, it generates a ringing signal of about approximately 40 V RMS, or equal to or greater than 40 V RMS as discussed above, having a waveform shape similar to the waveform of a traditional telephony signal.

A line card may be part of a subscriber's premise equipment ("SPE") device inside a consumer's home. To deliver power to the SPE, a typical household AC power supply may be used that provides AC current in the range of between approximately 105 V and 230 V. In order to facilitate compatibility with different styles of power outlets and powering schemes, the power supply conductor, or cord, may be terminated with a two prong plug that works in either a two prong receptacle or a three prong receptacle.

Although the use of a two prong plug facilitates compatibility with a wider range of receptacles, a two prong plug does not provide a safety ground path for the device to which it provides power. Thus, the internal circuitry of the device, while being possibly grounded through other means, a coaxial CATV cable, for example, is not safety grounded from the power supply power source. This may cause difficulty in obtaining listing by an independent, product-safety testing and certification organization, such as UNDERWRITERS LABORATORIES, INC.® ("UL®"). Abnormal testing may be required before certification and/or listing of a device that is not safety grounded is granted. This may cause delay in the introducing of a new product that is not safety grounded. In addition to protracted delay for testing, there is the possibility that a device being tested may not meet the certification's standards, thus delaying further introduction of the device into the stream of commerce until the device can be redesigned and retested. Such delay can be costly at best, and result in the stillbirth of a product at worst in the fast changing realm of modem telephony.

Current UL® standards specify that continuous internal voltages within an unearthed device not exceed a hazardous voltage level. If a device, such as a cable modem telephony line card, is not safety grounded, it is subjected to abnormal testing that impose "double insulation" requirements, for example, before the device becomes UL® "listed." However, if a device's internal voltages that rise above the predetermined safe level, approximately 50-60 volts, for example, are not continuous, but transient in nature, then the device may not be subject to abnormal testing due to internal voltages exceeding the predetermined safe level. Since line cards typically generate a ringing signal voltage of approximately 40 V RMS, or equal to or greater than 40 V, to cause a telephone to ring, an unearthed SPE having a line card that provides a telephone interface may be subjected to abnormal testing, and the aforementioned associated delay, before becoming listed, if an continuous, approximately 90-95 voltage tap, or node, is provided in the circuitry of the line card.

Thus, there is a need for a method and system that provides a 90-95 V ringing signal that is not continuous, but only high (above the predetermined safe level) during ringing, thereby being deemed transient in nature.

SUMMARY

It is an object to provide a method and system for maintaining telephony line voltages from a SLIC within a line card used in a cable telephony modem system below a predetermined safe level, while providing for increased voltage during ringing. This eliminates the need for meeting double insulation requirements and/or abnormal testing for indoor devices that are not safety grounded. Therefore, such a device can be brought to market rapidly and the design and/or testing costs performed to meet standards in order to obtain listing with a testing and certification organization, UL® for example, are reduced.

Generally described is an indoor, unearthed cable telephony device comprising an input power source, a control signal source, a voltage converter that operates in response to the control signal source and a node for providing a high battery output from the voltage converter. The control signal is provided from a processor that receives an incoming cable telephony signal to the voltage converter. The processor provides translation between the cable network protocol, typically a digital signal, and the SLIC, which is typically configured to provide and receive analog signals to and from a conventional telephone device. The voltage converter provides an energy signal to the SLIC, while the processor provides an information signal to the SLIC, without passing through the voltage converter. The voltage converter may comprise a fly back transformer, or a boost converter. These are merely examples of the means that may be used, as well as others known in the art, of selectively increasing the voltage to a circuit.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein, no specific conductor type, integrated circuit, discrete component, connector, enclosure, circuit board arrangement, capacitor or resistor value, or fuse rating, for example, is required to be used in the practicing of the present invention. Indeed, selection of such parts and components would be within the routine functions of a designer skilled in the art.

Figure 1:
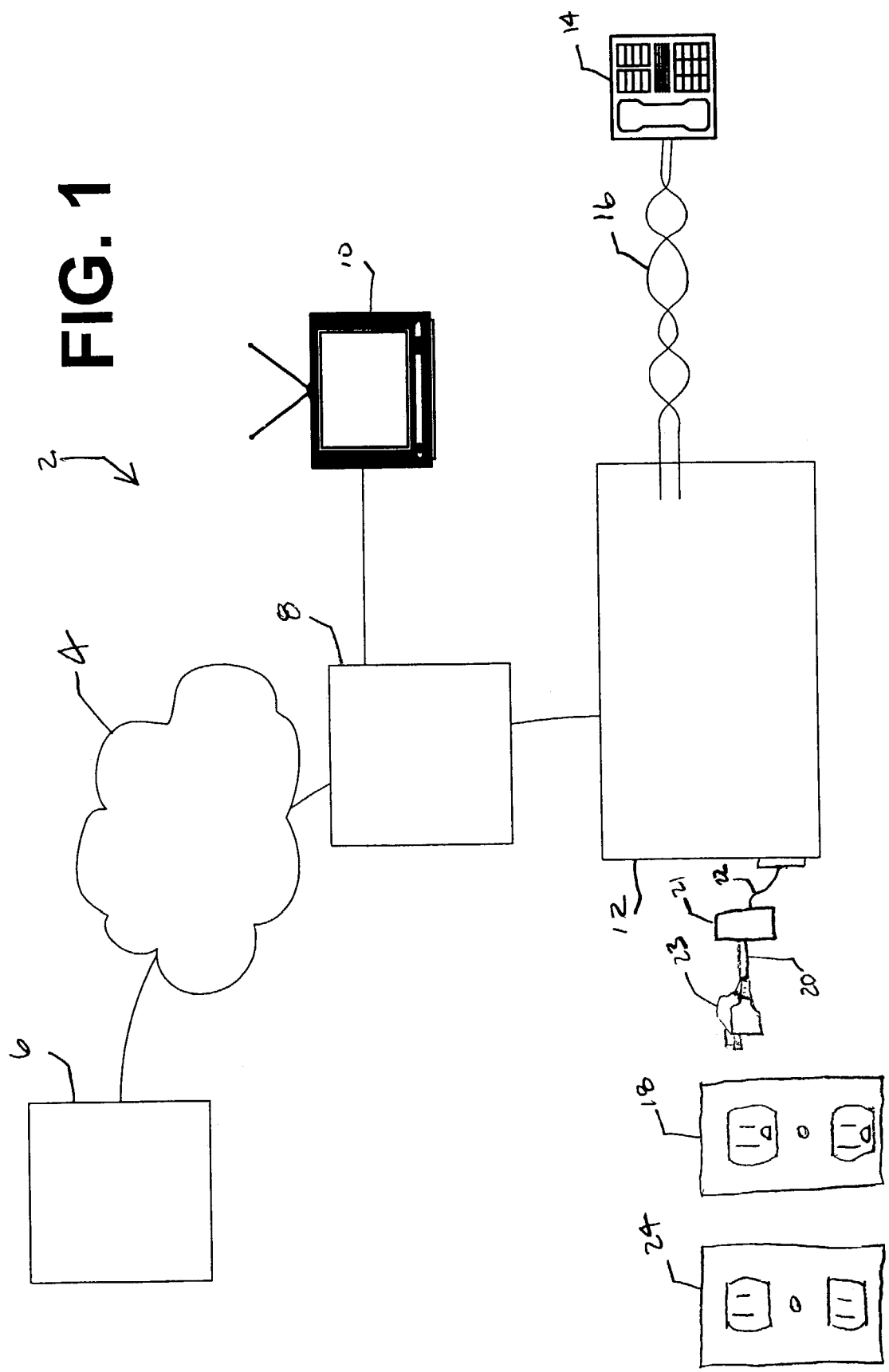
FIG. 1 illustrates a system that provides telephony services, as well as television programming, via a CATV network.

Turning now to the figures, FIG. 1 illustrates a system 2 for providing telephony services, as well as television programming, to an end user via a CATV network 4. A head end 6 acts as a central office for directing signals, including telephony signals, over network 4. Such signals may be received at subscriber premises equipment ("SPE") device 8 outside a user's home or office, for example. SPE 8 may determine how to route the signal based on the information type of signal, e.g., a television signal or a telephony signal. If the information signal contains television content, the signal may routed to television 10 as a standard CATV signal. If, however, the signal contains telephony information, the signal is routed to line card device 12 for further processing.

As the telephony information may have been transmitted over network 4 as a modulated CATV signal, an internet protocol ("IP") signal, or preferably as a Data Over Cable Service Interface Specification ("DOCSIS") signal, the line card translates the incoming signal format to POTS format. As POTS telephone 14 may be designed to ring when a signal having a level of about 40 V RMS, or equal to or greater than 40 V, is impressed into the twisted pair 16 that connects it to line card 12, the line card must produce this voltage level. Line card 12 uses power and energy from an indoor wall receptacle 18 that supplies standard AC house current at about 120 V. This house current is transmitted from receptacle 18 to line card device 12 via power cord 20. The household current is typically transformed to DC current at approximately 12-15 V by power supply 21, which supplies the DC current from its output to line card 12 via DC power cord 22. It is noted that power cord 20 is terminated with plug 23, which has only two prongs. A third prong for providing safety ground protection is not provided from plug 23. This allows compatibility with electrical systems that do not provide a safety ground conductor and that typically provide two-prong receptacles, as illustrated by receptacle 24.

Although the use of two-prong plug 23 facilitates use with a greater number of electrical system schemes, safety ground functionality is eliminated. This is so even when line card device 12 is used in an electrical system that supports a safety ground circuit, and that provides three-prong receptacles, because there is no third prong on plug 23 to connect the line card device to an existing safety ground circuit. In addition, even if plug 23 and cord 20 provide three conductors, cord 22 may typically contain only two conductors, and thus may not provide a safety ground circuit to line card 12. Thus, the generation of a 40 V RMS, or equal to or greater than 40 V RMS, signal within line card 12 may prevent the certification of said line card if the 40 V RMS, or equal to or greater than 40 V RMS, ringing signal source is constantly live.

Figure 2:
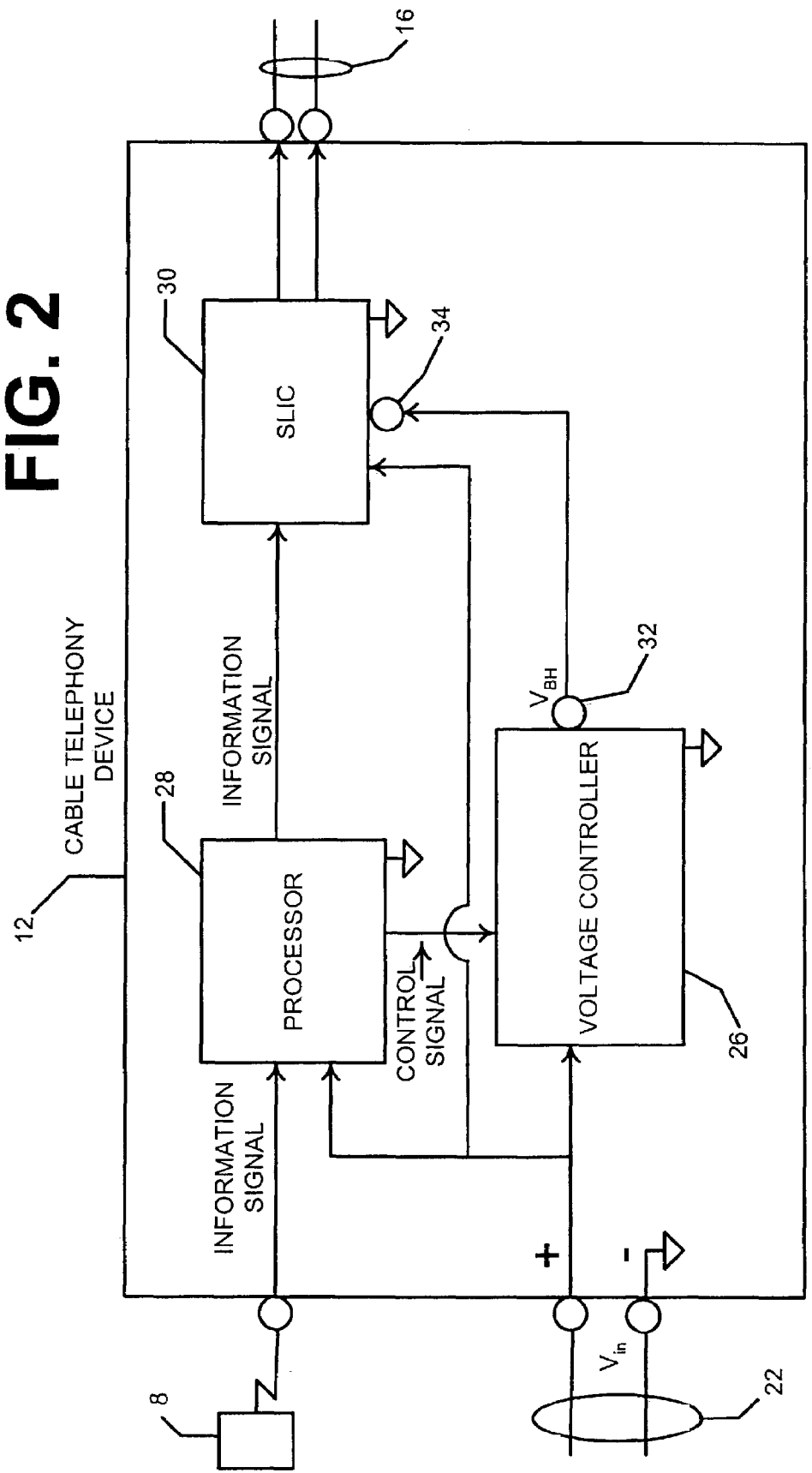
FIG. 2 illustrates a block diagram of a line card's components that generate a high voltage signal during ringing.

Turning now to FIG. 2, a block diagram of line card 12 is illustrated. Line card 12 receives power from power cord 22, which will typically contain two active conductors, a positive and a negative. The positive and the negative conductors carry DC current that has been transformed from AC household current known in the art for house current distribution. The negative conductor may be grounded to the chassis of line card 12, and the positive lead provides current to voltage controller 26. Processor 28 interfaces signals between SPE 8 and SLIC 30. Processor 28 also provides a control signal to voltage controller 26. It will be appreciated that processor 28 comprises a variety of components, including, for example, a microprocessor, media access control layer circuitry and software, digital-to-analog ("D/A") and analog-to-digital ("A/D") circuitry as well as other typical circuitry known in the art of cable telephony. Voltage controller 26 includes means, which will be discussed later, that can increase the 12 V DC signal from power source conductor 22 into the ringing supply voltage of approximately 95 V used by SLIC 30 to generate an approximately 40 V RMS ringing signal, thus causing a telephony device connected to twisted pair 16 to ring.

When processor 28 receives an information signal, it decodes the received signal, which may be a DOCSIS data signal, and uses D/A converters to convert it to an analog signal. In addition, if the received signal contains an instruction to ring a telephone connected to SLIC 30, a control signal is sent to voltage controller 26, thereby causing the means internal to the voltage controller to increase the voltage from the approximately 12-15 V to approximately 90-95 V. This increased voltage signal is produced at VBH node 32, which is connected to VBH input 34 at SLIC 30. SLIC 30 impresses the high voltage signal received at VBH node 34 into twisted pair lines 16, thereby causing a telephone connected thereto to ring. The SLIC 30 detects when a user picks up the handset of the telephone and then disconnects the high voltage signal from the twisted pair cable 16, thereby allowing an analog information signal received from the processor 28 to pass through the SLIC and on to the handset so that the user may then converse with the calling party.

Figure 3:
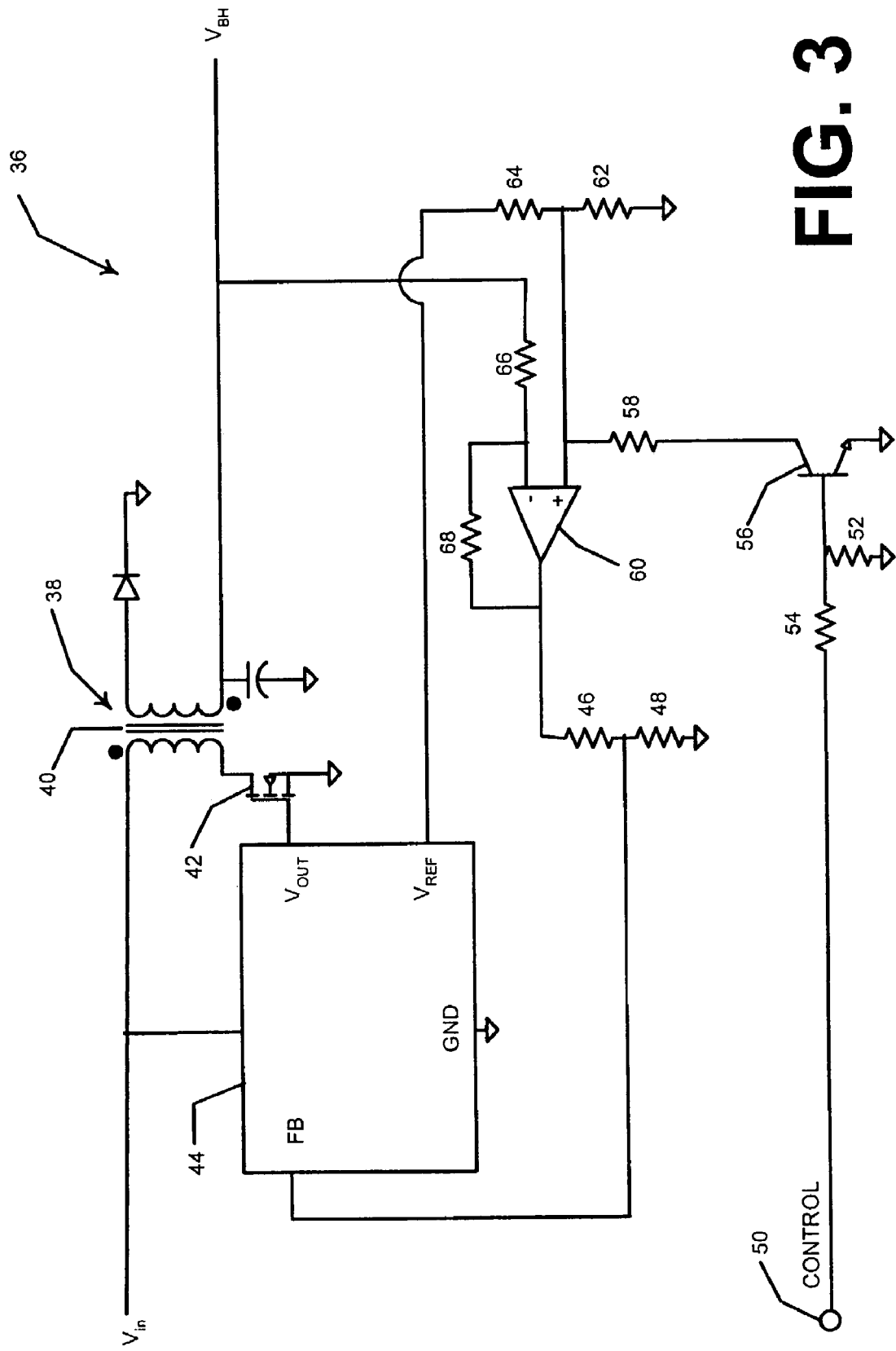
FIG. 3 illustrates a schematic diagram for providing a transient high voltage ringing signal.

Voltage controller 26, which converts the DC input voltage received from cable 22 into the higher ringing voltage, may comprise a variety of means. Turning now to FIG. 3, the preferred means for converting the DC voltage to the higher AC ringing voltage includes a fly back transformer, a schematic diagram of which is illustrated with reference to circuit 36, which may be included inside voltage controller 26, as shown in FIG. 2.

A fly back transformer 38 is used to store energy received from the supplied voltage $V_{in}$, and to discharge the stored energy as a higher voltage when the field in transformer's core 40 collapses. It will be appreciated by those skilled in the art that a flyback transformer is a special type of transformer that does not continuously transform an input voltage into an output voltage in direct proportion to its windings ratio.

Typically, energy is stored in an air gap in the transformer core. When the field from the primary winding collapses, the stored energy flows within the core, thereby inducing a field, and thus current, into the secondary winding of transformer 38. Therefore, current does not flow in the secondary when current flows in the primary, but flows as the field in the primary collapses. It will further be appreciated that flyback transformer 38 should be connected according to the dots shown in the figure. This arrangement lends itself for use with providing ringing signaling in telephony devices because telephony devices conventionally use a negative $V_{BH}$ to ring a telephone ringer.

In addition to the flyback transformer, various other components are used to provide the functionality of circuit 36. To provide on/off switching of current through the primary of transformer 38, transistor 42, preferably a MOSFET, is used. Transistor 42 receives its gate voltage from an output pin $V_{OUT}$ of feedback regulator 44. Feedback regulator 44 may be an off-the-shelf component known in the art, and provides a constant reference voltage at a $V_{REF}$ pin. The voltage at $V_{OUT}$ is controlled by a signal received by regulator 44 at a feedback pin ("FB") and alternates to provide a constantly increasing and collapsing field in the primary of transformer 38. Resistors 46 and 48 may be used to form a voltage divider that maintains the voltage level at FB in a predetermined range according to the manufacturer's specifications corresponding to regulator 44.

The control signal that provides the ringing instruction is received from the processor shown in FIG. 2 by circuit 36 at port 50. This ringing control is typically digital signal inasmuch as it is either at zero volts, indicating a no ring state, or at a logical full voltage, typically 3.3 V, indicating ringing state. The control signal passes through biasing resistors 52 and 54 for biasing of feedback transistor 56. When the control signal is low, transistor 56 is off. Therefore, current does not flow through draw-down resistor 58, and the voltage applied to operational amplifier ("op amp") 60 is $V_{REF} \times R_{62}/(R_{62}+R_{64})$. The resistance values of resistors 46, 48, 58, 62 and 64, as well as gain adjusting resistors 66 and 68 are selected such that when the control signal voltage at port 50 is low, the voltage impressed at pin FB of regulator 44 regulates the voltage at $V_{OUT}$ to maintain the voltage at $V_{BH}$ less that 60 V. It will be appreciated that the voltage at $V_{BH}$ is negative according to the phase relationship indication dots at fly back transformer 38.

When the control signal voltage at port 50 is high, such as 3.3 V, for example, as discussed above, transistor 56 turns on. This causes the collector of transistor 56 to draw through resistor 58 to ground, such that resistor 58 and resistor 62 are in parallel between the non-inverting input of op amp 60 and ground. Since the resistance of resistor 62 and 58 in parallel is less that the resistance of resistor 62 alone, the voltage at the non-inverting input of op amp 60 drops, and the feedback network comprising resistors 66 and 68 causes the output of op amp 60 to drop proportionally to the drop at the non-inverting input pin.

In order for the output of the op amp 60 to drop, the voltage at the inverting input drops proportionally thereto. As this inverting input voltage drops, the current through resistor 66 falls according to Ohm's Law, thereby causing the ringing voltage signal at $V_{BH}$ to drop. Accordingly, a properly selected resistance value of resistor 66 will cause the ringing signal at VBH to drop to a voltage lower than −60 V (lower because more negative, but having magnitude greater than 60 V), preferably approximately −90 V, when the ringing control signal at port 50 is high. Conversely, the voltage at $V_{BH}$ will rise above −60 V (the term rise indicates that the sign becomes less negative, although the magnitude is less that 60 V) when the ringing control signal voltage is low.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. An indoor, unearthed cable telephony device, comprising:

an input power source;

a control signal source;

means for converting power from the input power source into a high voltage battery ring signal in response to the control signal source being in a ring state, wherein the converting means includes a fly back transformer; and a feedback regulator for controlling the fly back transformer primary current through a primary current transistor interposed between an output pin of the feedback regulator and a current-exiting end of the transformer primary, the regulator being configured for providing a reference voltage from a reference voltage pin and further being configured for receiving a feedback signal at a feedback pin, the regulator determining the voltage at the output pin based on the feedback signal voltage;

an op amp circuit wherein the inverting input thereof receives input from the high voltage battery ring signal;

a feedback transistor, the base of which is connected to the control signal source and the collector of which is connected to the non-inverting input of the op amp through a draw-down resistor, the feedback transistor being biased such that it is off when the control signal is at a low voltage state and on when the control signal voltage is at a high voltage state, whereupon the current flows from the non-inverting input through the draw-down resistor and through the collector to emitter of the feedback transistor and from the emitter to ground; and a voltage divider including a first resistor that is interposed between the non-inverting input and ground and wherein a second resistor is interposed between the non-inverting input and the reference voltage pin, the first resistor being in parallel with the draw-down resistor when the control signal voltage is in a high state.

* * * * *